United States Patent
Chen

(10) Patent No.: US 6,361,467 B1
(45) Date of Patent: Mar. 26, 2002

(54) DIFFERENTIAL GEAR APPARATUS ADAPTED TO COUPLE WITH A PINION MECHANISM OF A WHEELED VEHICLE

(76) Inventor: Sen-Jung Chen, No. 236, Sec. 3, Ho-Ping W. Rd., Taipei City (TW)

( * ) Notice: Subject to any disclaimer, the term of this patent is extended or adjusted under 35 U.S.C. 154(b) by 0 days.

(21) Appl. No.: 09/574,992

(22) Filed: May 19, 2000

(51) Int. Cl.$^7$ ............................................. F16H 48/10
(52) U.S. Cl. ...................................... 475/247; 475/230
(58) Field of Search ................................ 475/230, 246, 475/247

(56) References Cited

U.S. PATENT DOCUMENTS

| | | | | |
|---|---|---|---|---|
| 1,057,466 | A | * 4/1913 | Taylor | 475/230 X |
| 1,076,560 | A | * 10/1913 | Duffy | 475/247 |
| 3,605,523 | A | * 9/1971 | O'Brien | 475/230 X |
| 3,779,102 | A | * 12/1973 | Pfarrwaller | 475/246 X |
| 4,289,047 | A | * 9/1981 | Hopkins | 475/246 |
| 4,860,614 | A | * 8/1989 | Erdmann et al. | 475/246 |
| 5,234,388 | A | * 8/1993 | Nordkvist | 475/246 |
| 5,273,498 | A | * 12/1993 | Dhillon et al. | 475/230 |
| 5,980,416 | A | * 11/1999 | Gafvert | 475/230 |
| 6,146,304 | A | * 11/2000 | Bendtsen | 475/230 |
| 6,176,152 | B1 | * 1/2001 | Victoria et al. | 475/230 X |

* cited by examiner

Primary Examiner—Charles A. Marmor
Assistant Examiner—Ha Ho
(74) Attorney, Agent, or Firm—Christie, Parker & Haley, LLP

(57) ABSTRACT

A differential gear apparatus includes a differential casing having a bearing surface for journalling of a right axle, two cavities at opposite sides of the bearing surface, and two radially extending holes formed in an outer annular wall thereof and communicating with the cavities such that two shafts are fitted therein and extend into the cavities. Two differential pinions are mounted respectively and rotatably on the shafts. A right bevel wheel is mounted on and is rotatable with the right axle, and meshes with the differential pinions. A left bevel wheel is mounted on and is rotatable with the differential casing and meshes with the differential pinions. A ring gear member has an outer toothed rim portion adapted to engage and be driven by a pinion mechanism, and an inner rim portion fittingly sleeved on the differential casing. A fastening member is disposed to releasably secure the ring gear member to the differential casing so as to inhibit rotating movement of the ring gear member relative to the differential casing. As such, the differential pinions are connected to the differential casing by the shafts, thereby preventing the movement of the differential pinions in an axial direction so as to provide a steady transmission and reduce the noise resulting from unsteady connection therebetween.

5 Claims, 4 Drawing Sheets

DIFFERENTIAL GEAR APPARATUS ADAPTED TO COUPLE WITH A PINION MECHANISM OF A WHEELED VEHICLE

BACKGROUND OF THE INVENTION

1. Field of the Invention

This invention relates to a differential gear apparatus, more particularly to a differential gear apparatus adapted to couple a drive of a pinion mechanism which transmits a drive torque of an output shaft of an electrically powered motor to right and left driving wheels of a wheeled vehicle.

2. Description of the Related Art

Referring to FIGS. 1 and 2, a conventional differential gear apparatus for a motorcar is adapted to couple a drive of a pinion mechanism which transmits a drive torque of an output shaft of an electrically powered motor to right and left axles 5,5' of right and left driving wheels of the motorcar. The conventional differential gear apparatus is shown to include a differential casing 1 and a side cover 11 that cooperate to form a space for receiving a gear member 2 which is driven by the motor. The gear member 2 has an axial hole 23 extending in an axial direction, and two elongate cavities 21 at two opposite sides of the axial hole 23, and two pin holes 22 are formed in central areas of the cavities 23 such that two pin shafts 33,33' are inserted respectively therein. Two differential pinions 3,3' are mounted respectively and rotatably on the pin shafts 33,33' by means of two bearing members 32,32'. The right and left axles 5,5' pass through axial holes 12,13 in the differential casing 1 and the side cover 11 and axial holes 41,41' in two bevel wheels 4,4'. The right axle 5 has an inner end 53 journalled in the axial hole 23 in the gear member 2. The bevel wheels 4,4' are mounted on and are rotatable with the right and left axles 5,5' via two pins 52,52' that pass through holes 51,51' formed in the right and left axles 5,5' and engage pin slots 42 of the bevel wheels 4,4', and meshwith the differential pinions 3,3'.

With reference to FIG. 3, since the differential pinions 3,3' are positioned in the cavities 21 by the pin shafts 33,33' which are retained in the pin holes 22, they tend to move in the axial direction (indicated by the arrow (B)), thereby resulting in unsteady transmission thereof. When the right and left axles 5,5' are positioned offset from a central axis, indicated by the arrow (A), or when there is a clearance between the differential pinions 3, 3' and the bevel wheels 4,4', the transmission of the differential gear apparatus will be unsteady and results in a relatively loud noise. In addition, when one element thereof, such as the bevel wheel 4, is to be replaced, it is necessary to separate all elements of the conventional differential gear apparatus from one another, thereby resulting in inconvenience.

SUMMARY OF THE INVENTION

The object of the present invention is to provide a differential gear apparatus which is capable of overcoming the aforesaid drawbacks.

According to this invention, the differential gear apparatus includes a differential casing having an outer annular wall which defines a first axis and which is provided with right and left annular ends opposite to each other in a first axial direction parallel to the first axis, and right and left walls which respectively extend from the right and left annular ends in a first direction transverse to the first axial direction. The right wall has a bearing surface which is located in a central area thereof and which extends along the first axis and towards the left wall, and front and rear cavities which are disposed at two opposite sides of the bearing surface and which extend respectively in a first longitudinal direction that is parallel to the first axial direction and towards the left wall. The front and rear cavities further extend respectively in a second transverse direction that is transverse to both the first longitudinal direction and the first transverse direction so as to form front and rear inner walls. The front and rear inner walls are spaced apart from each other in the first transverse direction and face the bearing surface. The outer annular wall of the differential casing has first and second radially extending holes which are aligned diametrically and which communicate respectively with the front and rear cavities. Front and rear shafts are respectively disposed to be fitted in the first and second radially extending holes such that each of the front and rear shafts extends into a respective one of the front and rear cavities while disposed radially and inwardly of the outer annular wall. Front and rear differential pinions are mounted respectively and rotatably on the front and rear shafts. A right axle has a right inner end journalled on the bearing surface and rotatable with the differential casing about the first axis, and a right outer end adapted to be rotated with the right driving wheel. A right bevel wheel is mounted on and is rotatable with the right axle, and meshes with both of the front and rear differential pinions. A left bevel wheel is spaced apart from the right bevel wheel in the first axial direction, and is mounted on and is rotatable with the left wall of the differential casing. The left bevel wheel is adapted to be rotated with the left driving wheel about the first axis, and meshes with the front and rear differential pinions. A ring gear member has an outer toothed rim portion adapted to engage and be driven by the pinion mechanism, and an inner rim portion opposite to the outer toothed rimportion radially, and of such a dimension as to be fittingly sleeved on the outer annular wall of the differential casing. A fastening member is disposed to releasably secure the ring gear member to the differential casing in the first axial direction so as to inhibit rotating movement of the ring gear member relative to the differential casing about the first axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
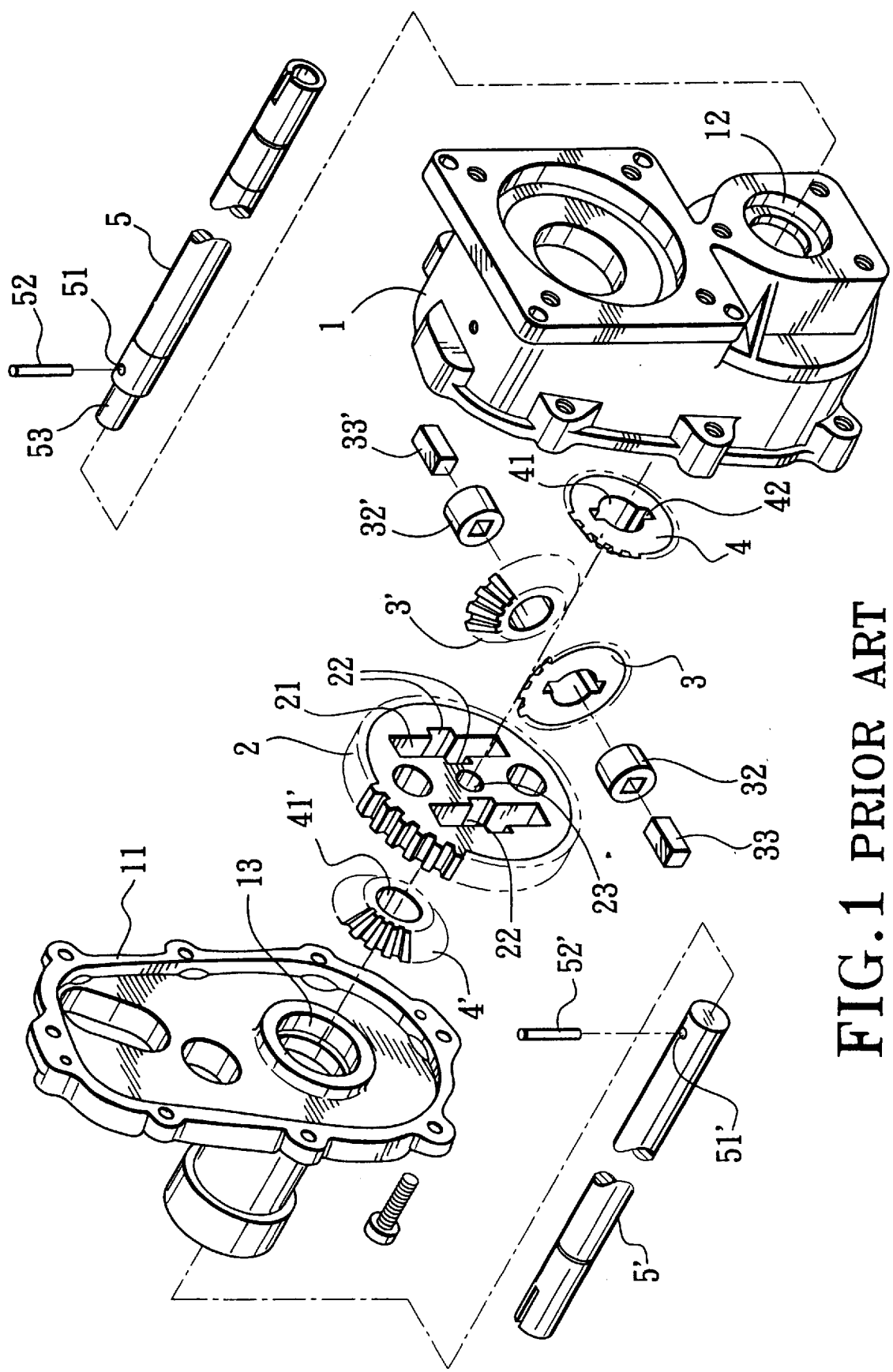
FIG. 1 is an exploded perspective view of a conventional differential gear apparatus.
Figure 2:
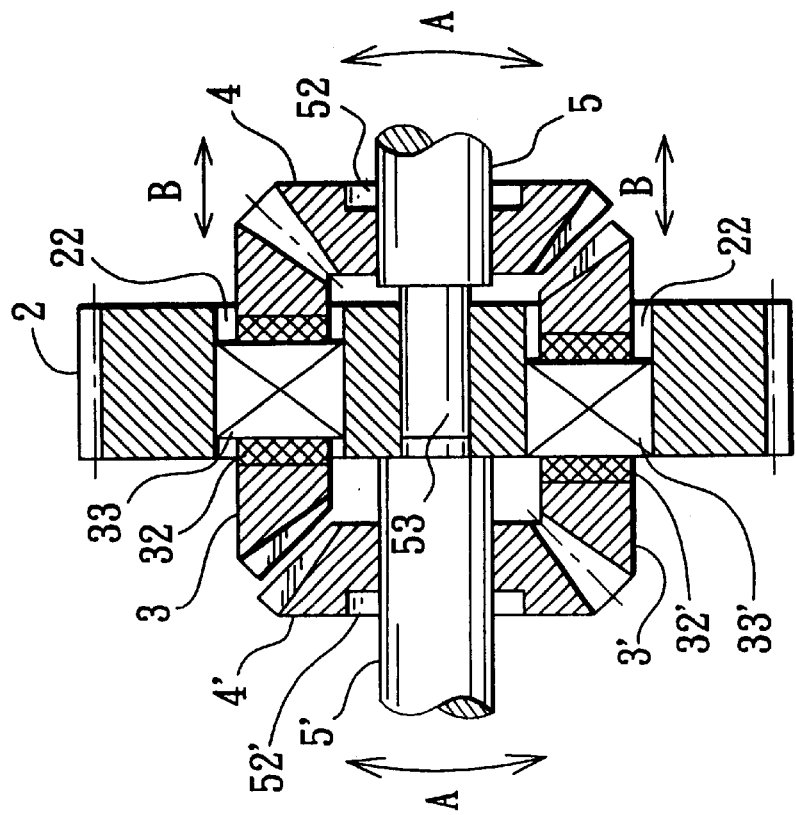
FIG. 2 is a sectional view of the conventional differential gear apparatus.
Figure 3:
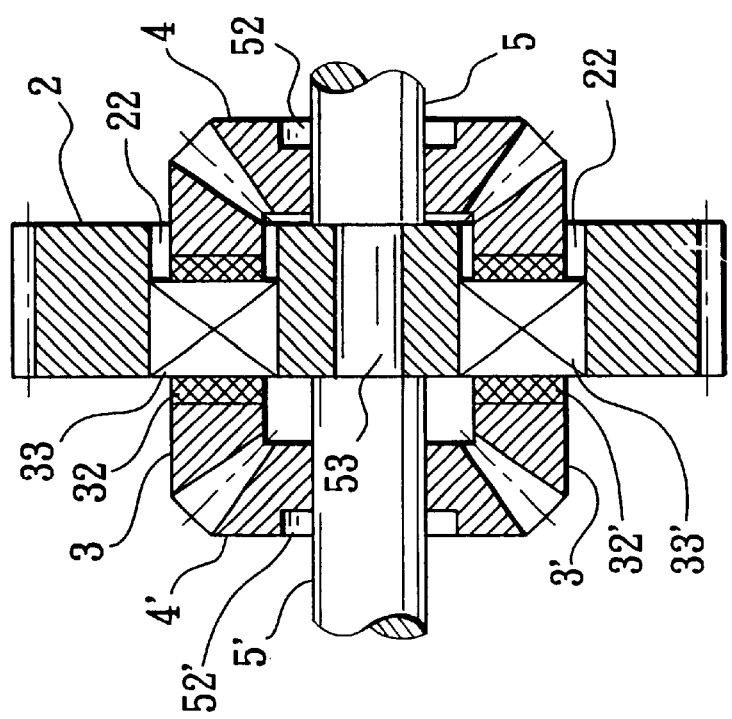
FIG. 3 is a sectional view showing the conventional differential gear apparatus in a state of use.
Figure 4:
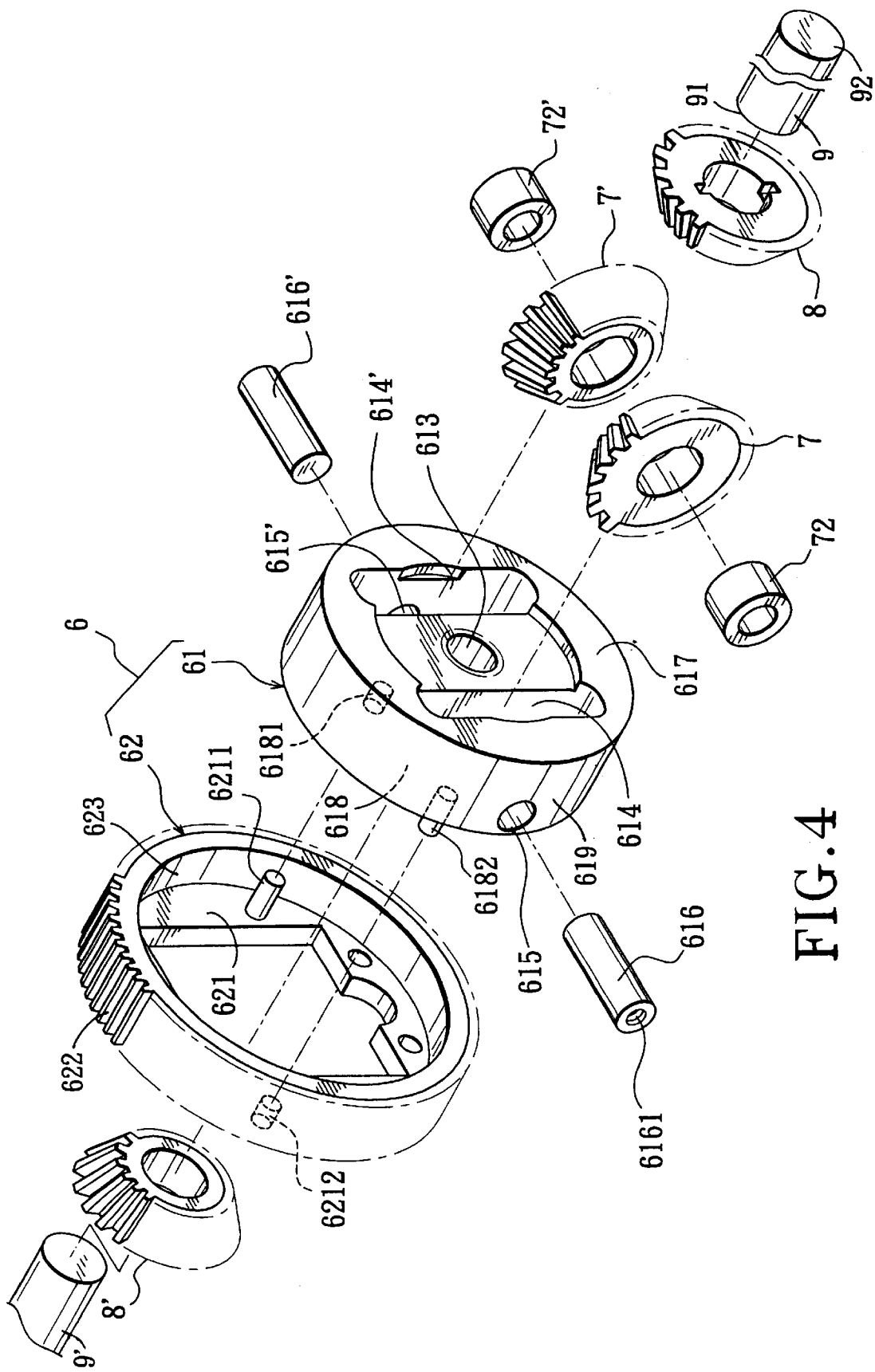
FIG. 4 is an exploded perspective view of a preferred embodiment of a differential gear apparatus according to this invention.
Figure 5:
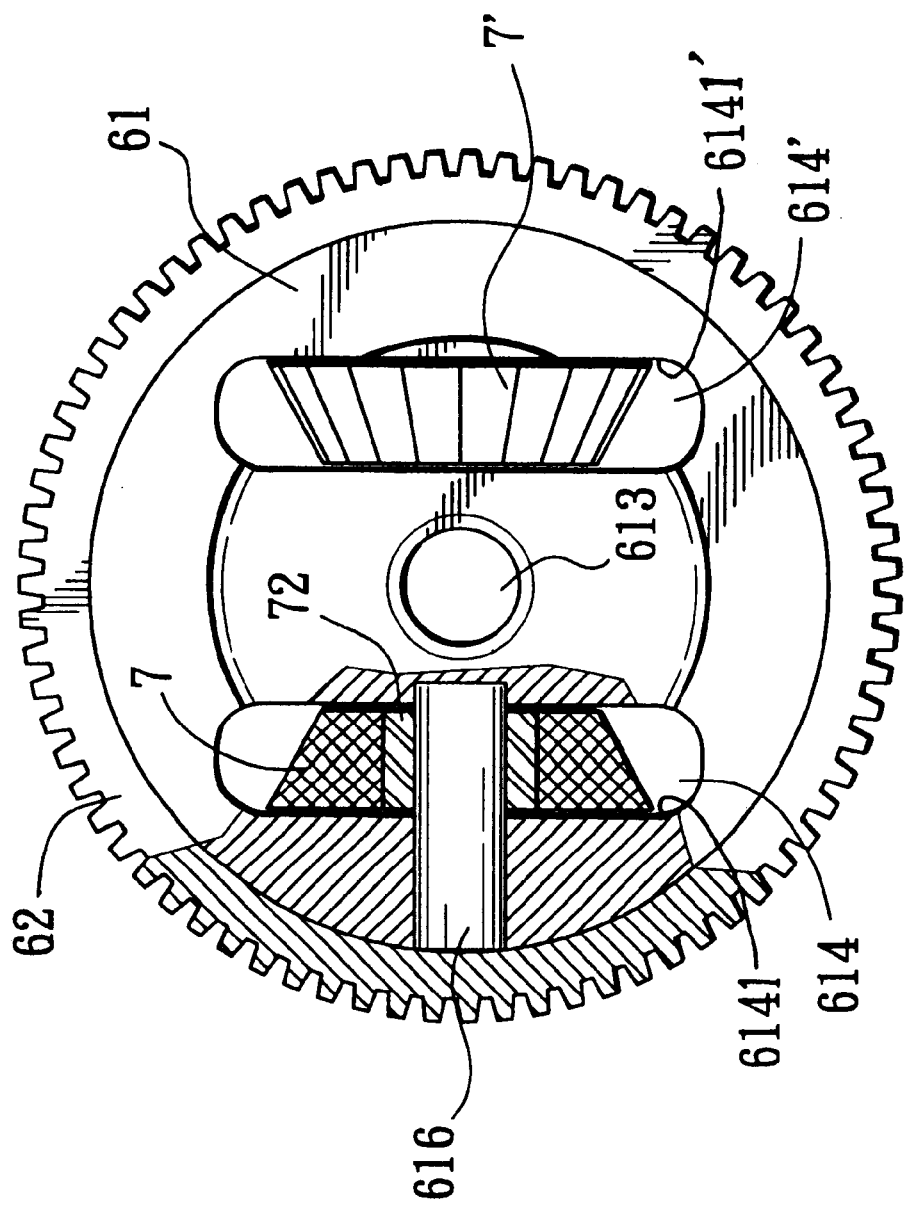
FIG. 5 is a partly sectional schematic view of the preferred embodiment.

Referring to FIGS. 4 and 5, the preferred embodiment of the differential gear apparatus according to the present invention is shown to comprise a differential casing assembly 6, front and rear differential pinions 7,7', right and left axles 9,9', and right and left bevel wheels 8,8'.

The differential casing assembly 6 includes a differential casing 61 and a ring gear member 62. The differential casing 61 includes an outer annular wall 619 which defines a first axis and which is provided with right and left annular ends opposite to each other in a first axial direction parallel to the first axis, and right and left walls 617,618 which respectively extend from the right and left annular ends in a first direction transverse to the first axial direction. An axial hole 613 is defined by an inner annular surface which communicates the right and left walls 617,618 around the first axis and which serves as a bearing surface. Front and rear cavities 614,614' are disposed at two opposite sides of the axial hole 613, and extend respectively in a first longitudinal direction which is parallel to the first axial direction. The cavities 614,614' further extend respectively in a second transverse direction which is transverse to both the first longitudinal direction and the first transverse direction so as to form front and rear inner walls 6141,6141' that are spaced apart from each other in the first transverse direction and that face the axial hole 613. The outer annular wall 619 has first and second radially extending holes 615,615' which are aligned diametrically and which are communicated respectively with the front and rear cavities 614,614'.

Front and rear shafts 616,616' are respectively disposed to be fitted in the first and second radially extending holes 615,615' such that each of the front and rear shafts 616,616' extends into a respective one of the front and rear cavities 614,614' while disposed radially and inwardly of the outer annular wall 619.

The front and rear differential pinions 7,7' are mounted respectively and rotatably on the front and rear shafts 616,616'. In addition, right and left bearing members 72,72' are disposed between the front shaft 616 and the front differential pinion 7 and between the rear shaft 616' and the rear differential pinion 7', respectively.

The right axle 9 has a right inner end 91 which is journalled on the bearing surface of the axial hole 613 and which is rotatable with the differential casing 61 about the first axis, and a right outer end 92 which is adapted to be rotated with a right driving wheel (not shown) of a wheeled vehicle.

The right bevel wheel 8 is mounted on and is rotatable with the right axle 9. The right bevel wheel 8 meshes with both of the front and rear differential pinions 7,7'.

The left bevel wheel 8' is spaced apart from the right bevel wheel 8 in the first axial direction, and is mounted on and is rotatable with the left wall 618 of the differential casing 61. The left bevel wheel 8 is adapted to be rotated with a left driving wheel (not shown) of the wheeled vehicle about the first axis, and meshes with the front and rear differential pinions 7,7'.

The ring gear member 62 has an outer toothed rim portion 622 which is adapted to engage and be driven by a pinion mechanism (not shown) so as to transmit a drive torque of an output shaft of an electrically powered motor (not shown) to the right and left axles 9,9' upon which the right and left driving wheels are mounted. The ring gear member 62 further has an inner rim portion 623 which is opposite to the outer toothed rim portion 622 radially, and which is of such a dimension as to be fittingly sleeved on the outer annular wall 619 of the differential casing 61. The outer toothed rim portion 622 has an abutment wall 621 which extends from a left side end thereof inwardly and radially to serve a barrier to limit the movement of the differential casing 61 relative to the ring gear member 62 in the first axial direction.

A fastening member includes a plurality of plugs 6211, 6182 which are disposed on the abutment wall 621 and the left wall 618 and which are radially offset from the first axis, and a plurality of sockets 6181,6212 which are disposed in the left wall 618 and the abutment wall 621 for the plugs 6211, 6182 to fittingly and respectively engage therein so as to releasably secure the ring gear member 62 to the differential casing 61 in the first axial direction, thereby inhibiting rotating movement of the ring gear member 62 relative to the differential casing 61 about the first axis.

As described above, the front and rear differential pinions 7,7' are connected to the differential casing 61 by means of the front and rear shafts 616,616', thereby preventing the movement of the front and rear differential pinions 7,7' in the first axial direction so as to provide a steady transmission and reduce the noise resulting from unsteady connection therebetween. In addition, it is possible to replace the right and left bevel wheels 8,8' without detaching the front and rear differential pinions 7,7' from the differential casing 61. It is also possible to replace the ring gear member 62 without detaching any of the elements mounted therein.

Moreover, each of the front and rear shafts 616,616' has a screw hole 6161 such that a screw bolt (not shown) can be inserted therein to pull the front and rear shaft 616,616' away from the first and second radially extending holes 615,615'.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A differential gear apparatus adapted to couple a drive of a pinion mechanism which transmits a drive torque of an output shaft for an electrically powered motor to right and left driving wheels of a wheeled vehicle, said differential gear apparatus comprising:

a differential casing including an outer annular wall that defines a first axis and that is provided with right and left annular ends opposite to each other in a first axial direction parallel to the first axis, and right and left walls that respectively extend from said right and left annular ends in a first direction transverse to the first axial direction, said right wall having a bearing surface located in a central area thereof and extending along the first axis and towards said left wall, and front and rear cavities disposed at two opposite sides of said bearing surface, and extending respectively in a first longitudinal direction which is parallel to the first axial direction and towards said left wall, said front and rear cavities further extending respectively in a second transverse direction which is transverse to both the first longitudinal direction and the first transverse direction so as to form front and rear inner walls that are spaced apart from each other in the first transverse direction, and that face said bearing surface, said outer annular wall having first and second radially extending holes aligned diametrically and communicating respectively with said front and rear cavities;

front and rear shafts respectively disposed to be fitted in said first and second radially extending holes such that each of said front and rear shafts extends into a respective one of said front and rear cavities while disposed radially and inwardly of said outer annular wall;

front and rear differential pinions mounted respectively and rotatably on said front and rear shafts;

a right axle having a right inner end journalled on said bearing surface and rotatable with said differential casing about the first axis, and a right outer end adapted to be rotated with the right driving wheel;

a right bevel wheel mounted on and rotatable with said right axle, said right bevel wheel meshing with both of said front and rear differential pinions;

a left bevel wheel spaced apart from said right bevel wheel in the first axial direction, said left bevel wheel being mounted on and being rotatable with said left wall, and being adapted to be rotated with the left driving wheel about the first axis, said left bevel wheel meshing with said front and bear differential pinions;

a ring gear member having an outer toothed rim portion adapted to engage and be driven by the pinion mechanism, and an inner rim portion opposite to sad outer toothed rim portion radially, and of such a dimension as to be fittingly sleeved on said outer annular wall of said differential casing, wherein said inner rim portion limits outward radial movement of the front and rear shafts; and a fastening member disposed to releasably secure said ring gear member to said differential casing in the first axial direction so as to inhibit rotating movement of said ring gear member relative to s aid differential casing about the first axis.

2. The differential gear apparatus as claimed in claim 1, wherein said outer toothed rim portion of said ring gear member has a left side end and an abutment wall extending from said left side end in the second transverse direction to serve a barrier to limit the movement of said differential casing relative to said ring gear member in the first axial direction.

3. The differential gear apparatus as claimed in claim 2, wherein said fastening member includes a plug and a socket for said plug to fittingly plug in, which are respectively disposed between said abutment wall and said left wall and which are radially offset from the first axis.

4. The differential gear apparatus as claimed in claim 1, further comprising front and rear bearing members disposed between said front shaft and said front differential pinion and between aid rear shaft and said rear differential pinion, respectively.

5. The differential gear apparatus as claimed in claim 1, wherein said bearing surface is an inner annular surface defining an axial hole around the first axis.

\* \* \* \* \*